United States Patent
Miller

(10) Patent No.: US 6,305,587 B1
(45) Date of Patent: Oct. 23, 2001

(54) EXPANDABLE COMPUTER TOTE

(75) Inventor: Jacqueline N. Miller, Boca Raton, FL (US)

(73) Assignee: Travelpro International, Inc., Boca Raton, FL (US)

( * ) Notice: Subject to any disclaimer, the term of this patent is extended or adjusted under 35 U.S.C. 154(b) by 0 days.

(21) Appl. No.: 09/466,622

(22) Filed: Dec. 17, 1999

(51) Int. Cl.⁷ ........................................ A45F 4/02
(52) U.S. Cl. .................. 224/153; 224/576; 224/582; 224/930
(58) Field of Search .................. 224/575, 576, 224/153, 581, 582, 930

(56) References Cited

U.S. PATENT DOCUMENTS

| | | |
|---|---|---|
| 3,622,056 | 11/1971 | Droeger . |
| 3,842,953 | 10/1974 | Royet . |
| 3,995,802 | 12/1976 | Johnston . |
| 4,273,274 | 6/1981 | Freistadt . |
| 4,561,576 | 12/1985 | Lowe et al. . |
| 4,887,751 | 12/1989 | Lehman . |
| 4,901,897 | 2/1990 | Briggs et al. . |
| 5,010,988 * | 4/1991 | Brown ................................ 190/104 |
| 5,217,119 | 6/1993 | Hollingsworth . |
| 5,295,565 | 3/1994 | Latshaw . |
| 5,377,887 | 1/1995 | Garcia . |
| 5,415,332 | 5/1995 | Kliot . |
| 5,494,157 | 2/1996 | Golenz et al. . |
| 5,509,515 * | 4/1996 | Guo ....................... 190/110 |
| 5,529,229 | 6/1996 | Fier . |
| 5,544,792 | 8/1996 | Arnwine . |
| 5,630,488 | 5/1997 | Chen . |
| 5,706,992 | 1/1998 | Moor . |
| 5,749,503 | 5/1998 | Wulf et al. . |
| 5,881,932 | 3/1999 | Wadden . |
| 5,887,770 | 3/1999 | Covell . |
| 5,964,384 * | 10/1999 | Young ................. 224/153 |
| 6,015,072 * | 1/2000 | Young ................. 224/153 |

* cited by examiner

Primary Examiner—Stephen K. Cronin
(74) Attorney, Agent, or Firm—Akerman Senterfitt

(57) ABSTRACT

A computer tote convertible from a hand-carried attache case to a shoulder-carried backpack. As an attache case, the computer tote may be carried by retractable handles and a convertible compartment houses a shoulder harness and a backpack compartment in a small, compact manner. The convertible compartment can be opened so that the harness and backpack compartment can be unfolded. The backpack compartment expands the size of the case so as to allow additional items to be carried therein, and the shoulder harness facilitator carrying the expanded tote on a user's back. The computer case has numerous other interior and exterior zippered compartments including a computer compartment. The computer compartment is sized for securely containing a portable computer and is lined with padded board for protecting the computer.

39 Claims, 9 Drawing Sheets

EXPANDABLE COMPUTER TOTE

CROSS-REFERENCE TO RELATED APPLICATIONS (Not applicable)

STATEMENT REGARDING FEDERALLY SPONSORED RESEARCH OR DEVELOPMENT (Not applicable)

BACKGROUND OF THE INVENTION

1. Technical Field

The present invention relates to luggage especially adapted to be used for carrying portable computers.

2. Description of the Related Art

The prior art has developed a variety of bags, cases or totes for transporting and protecting sensitive electronic items, such as portable computers. See e.g. U.S. Pat. Nos. 5,217,119, 5,494,157 and 5,706,992. The disclosure of these publications and of all other publications referred to herein are incorporated by reference as if fully set forth herein.

These patents disclose bags or cases particularly suited to contain and protect portable computers in a relatively small package while providing enough additional storage space for computer related accessories and possibly business or scholastic documents. For example, the cases disclosed in these patents include compartments lined with high density foam to reduce the likelihood of damaging the computer during transit. These patents also disclose portable computer cases resembling traditional attache cases in which the case carried by one hand or suspended over one shoulder as well as cases in the form of a backpack having shoulder straps suitable for securing the case to a user's back. Moreover, the patents disclose the use of multiple carrying modes for one case, for example, an attache type case having both a handle and a shoulder strap.

The prior art also discloses other bags and carrying cases that can be converted from one style having one or more carrying means to another style case having other carrying means. For example, a handbag having a strap handle that can be reconfigured as shoulder straps is disclosed in U.S. Pat. No. 4,273,274 and a wheeled suitcase having a shoulder harness for carrying the suitcase over uneven terrain is disclosed in U.S. Pat. No. 5,749,503. These systems provide a user the option to carrying the case in alternate ways as desired. For example, if the bag is heavily loaded so that it is not easily held by one hand or if one is using one's hands for other purposes, such as opening a door, the aforementioned bag and suitcase can be carried on one's back via the shoulder harness.

However, this convertability often comes at the price of an aesthetically displeasing bag in which additional handles or strapping are affixed to the bag. Prior art designs provide removable handles and straps, however, typically hooks, rings and other fastening means remain attached to the outside of the bag. Moreover, other prior art designs provide for the concealment of these additional handles and straps by disposing them within a storage compartment or other dedicated pocket within the bag. If the extra strapping or handles are kept in otherwise usable storage space, the user may have to sacrifice carrying additional objects or supplies in order to carry the straps/handles. This is particularly disadvantageous for transporting portable computers, which include a number accessories vital to its operation, such as a power supply, external storage devices and pointing devices. In this case, the user is required to forego the convenience of alternate carrying means or fasten the handles/straps in place even if a different carrying means will be used.

Moreover, even if the handles/straps are kept in dedicated pockets so that they are not occupying storage compartments, the total volume of storage space for a given size bag is reduced by the space occupied by the dedicated pocket. In other words, since these dedicated pockets are typically inappropriately sized to be used as item storage compartments, the usable storage space of the bag is not increased when the extra handles/straps are being used.

In other prior art designs, rather than stowing additional handles or straps, the same handle/strap is used in all carrying means. Typically, however, the handles/straps of these designs are not optimally sized for each carrying means, due to the differing size requirements of the various carrying means. Consequently, these bags are often clumsy and awkward to carry such that the bags may be mishandled and the contents damaged. This is particularly disadvantageous when carrying delicate, high-priced electronics, such as a portable computer, that may contain highly important information.

Accordingly, there is therefore a need for an improved computer tote.

SUMMARY OF THE INVENTION

The present invention provides a computer tote that can be converted from an attache case to a backpack. The backpack configuration provides for an expanded storage volume and an attached harness for wearing the tote upon a person's back and shoulders.

Specifically, the invention provides a tote for toting a portable computer having an expandable storage volume defined by a front, a back, opposite sides, a top and a bottom. A computer compartment forming part of the storage volume is sized to contain the portable computer. The computer compartment is accessible through an opening at least at the top having a first closure mechanism for opening and closing the computer compartment. A convertible compartment is connected to the computer compartment and separated therefrom by a partition substantially parallel to the front and back. The convertible compartment has a closure mechanism extending about its periphery for opening and closing the convertible compartment so as to transform the tote between an attache case configuration and a backpack configuration. The tote includes a handle graspable at the top of the tote so as to carry the tote by hand at least when it is in its attache case configuration. The tote also includes a backpack harness having a pair of shoulder straps disposed within and deployable from the convertible compartment such that the tote can be carried on a user's back when in the backpack configuration. The convertible compartment can be expended outward to define a compartment of increased storage volume, such that the tote storage volume is greater in the backpack configuration than in the attache case configuration.

The convertible compartment defines a backpack compartment when in the backpack configuration. The backpack compartment has an opening at least at the top for accessing the backpack compartment as well as a second closure mechanism extending along this opening for opening and closing the backpack compartment. The backpack compartment preferably extends upward past the plane of the top as that the tote resembles a conventional backpack. The backpack compartment includes a rain flap disposed along and covering the second closure mechanism. The flap prevents moisture, such as rain, from entering the inside of the backpack compartment through the second closure mechanism. Additionally, the backpack compartment includes an external loop at its top. The loop can be used to hang the tote by a suitable hook. The loop may also be an alternate means of carrying the tote in the backpack configuration.

The shoulder harness straps have a first end and a second end, the first end being fastened at a top portion of the backpack compartment and the second end being fastened to a bottom side portion of the backpack compartment within the perimeter of the peripheral closure mechanism. In this way, the shoulder harness can be completed concealed from view with the convertible compartment is closed. Moreover, each of the shoulder straps are adjustable to define various sized shoulder openings allowing the shoulder straps to be loosened when taking off or putting on the tote as well as to be tightened so as to snugly fit differently sized users. In one arrangement, the shoulder straps are comprised of two straps. Each of the first straps are attached at one end to the top of the backpack compartment and each of the second straps are attached at one end to a bottom side of backpack compartment. The free ends of each set of first and second straps are coupled by a strap buckle. Preferably, the first straps include a padding material.

The carrying handle is at least partially retractable into the tote. Specifically, the handle is U-shaped having a pair of longitudinal legs or uprights joined at one end to each end of a cross member. The uprights have a stop member at their free end. The tote also has a pair of retaining openings mounted to a partition wall of the case to define a pair parallel slots sized to permit the handle uprights to slide longitudinally within the retaining openings from proximate the cross member to proximate the stop members. The tote can include a pair of such handles in which the uprights are flexible such that the cross members of both handles can be grasped by one hand.

The computer compartment includes cushion material for protecting a computer stored therein. The cushion material is preferably located at front, back, bottom and end sides.

In another aspect, the present invention is a tote convertible from an attache case configuration defining a first storage volume to a backpack configuration defining a second storage volume wherein the second storage volume is larger than the first storage volume. The tote has a front side, a back side, opposite end sides, a top side and a bottom side. The tote includes a convertible compartment defined in part by the back side and has a closure member at the periphery of the back side that is used to convert the tote between attache case and backpack configurations. Specifically, when the peripheral closure member is fastened is joins the back side to the top, bottom and end sides to define the attache case configuration and when it unfastened permits the back side to be extended outward at collapsible sides joining the back side to the top side, bottom and end side so as to define the backpack configuration. A handle extends from one of the sides for carrying the tote by hand when in the attache configuration. Also, a shoulder harness is attached within and deployable from the convertible compartment for shoulder carrying the tote when in the backpack configuration.

The peripheral closure member is preferably a zipper having first and second fastener halves, with the first fastener half being attached at a rear perimeter formed by the top, bottom and end sides and the second fastener half being attached to the back side perimeter. Preferably, the peripheral closure member is a convention zipper, however alternatively, it may also be a hook and loop fastener.

The backpack compartment further includes front and rear upper portions extending upward past the plane of the top side. The rear upper portion extends substantially in the plane of the back side so as to form a back side of increased surface area. The front and rear upper portions give the tote the appearance of a conventional backpack when in it is the backpack configuration. Preferably, the back side and rear upper portion include padding material. The front and rear upper portions can be folded inwardly into the backpack compartment opening for collapsing the backpack compartment. Preferably, the front and rear upper portions are folded at respective parallel front and rear fold axes substantially in the same plane as the top side.

The shoulder harness includes first and second shoulder straps each having top and bottom ends attached to the backpack compartment such that when the tote is in the attache case configuration the shoulder harness is not visible. The top ends are fastened to the rear upper portion. The first shoulder strap bottom end is fastened to a first end side of the collapsible sides and the second shoulder strap bottom is fastened to an opposite end side of the collapsible sides. Preferably, the first and second shoulder straps each have a ribbon portion at the bottom end and a padded portion of increased width and thickness at the top end.

The shoulder harness also includes strap buckles for adjusting the size of shoulder loops formed by the first and second straps. The ribbon portions have first and second halves. The first halves each have a free end and an opposing fixed end joined to a corresponding padded portion. The second halves each have a free end and an opposing fixed end comprising the strap bottom ends. The ribbon portion free ends of each strap are adjustably joined by the strap buckles.

The backpack compartment opening extends down the collapsible end sides so that the first and second strap padded portions can be disposed within the backpack compartment when the upper portions are folded into the backpack compartment opening.

Thus, the present invention provides a computer tote that defines an attache case configuration for carrying the tote by hand having a thin profile convertible compartment that can be quickly and easily converted to define a backpack configuration having a shoulder harness for shoulder carrying the tote. The convertible compartment expands into a backpack compartment, increasing the storage volume of the tote and having upper portions that give the tote the aesthetic appeal of a conventional backpack. The backpack compartment can be collapsed to return the tote to the attache case configuration without the shoulder harness being visible from the exterior of the tote.

These and still other advantages of the present invention will be apparent from the description of the preferred embodiments which follow.

BRIEF DESCRIPTION OF THE DRAWINGS

FIG. 9A is a right side view of the tote with the convertible compartment opened and partially expanded outward, with the shoulder harness stowed away;

FIG. 9B is a right side view of the tote shown with the backpack compartment partially expanded and the shoulder harness deployed;

FIG. 9C is a right side view of the tote shown fully expanded in the backpack configuration;

FIG. 9D is a right side view of the tote shown with a back top portion folded inward into an opening of the backpack compartment before the shoulder harness straps are stowed;

FIG. 9E is a cut-away right side view of the tote with the backpack compartment shown with the back top portion folded inwardly and a padded portion of a shoulder harness strap disposed within the backpack compartment;

FIG. 9F is a right side view of the tote with the backpack compartment shown with the front and back top portions folded into the opening of the backpack compartment and the padded portions of shoulder harness shoulder straps disposed within the backpack compartment so it may be compressed and closed by a peripheral closure member;

DETAILED DESCRIPTION OF THE PREFERRED EMBODIMENTS

Figure 1:
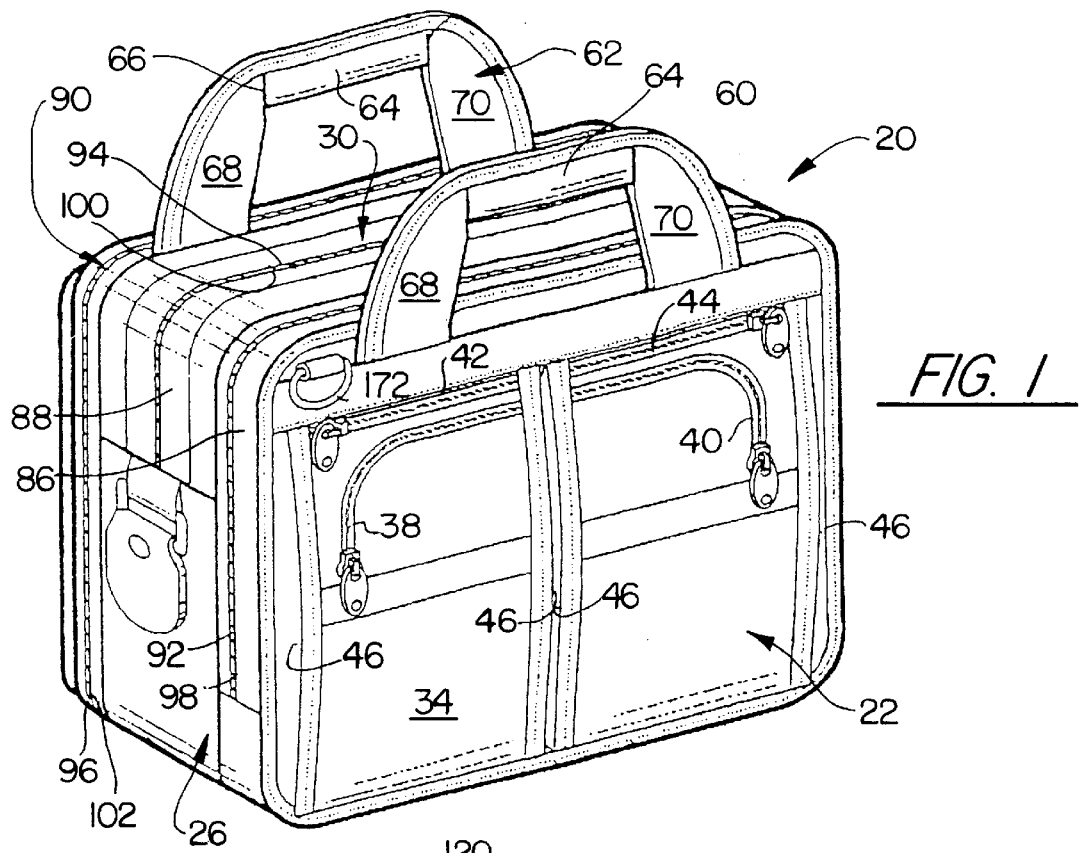
FIG. 1 is a perspective view of the expandable computer tote of the present invention, shown in an attache case form.

Referring to the drawings in detail, the expandable computer tote of the present invention is referred to generally by reference numeral 20. Referring to FIGS. 1–6, the computer tote 20 is shown in an attache case configuration having a front side 22, a back side 24, end sides 26 and 28, a top side 30 and a bottom side 32. Preferably, the sides are made of a suitable high-strength plastic fabric, such as 1050D Ballistic Nylon commercially available from E.I. Du Pont de Nemours, Co. (Du Pont).

Figure 2:
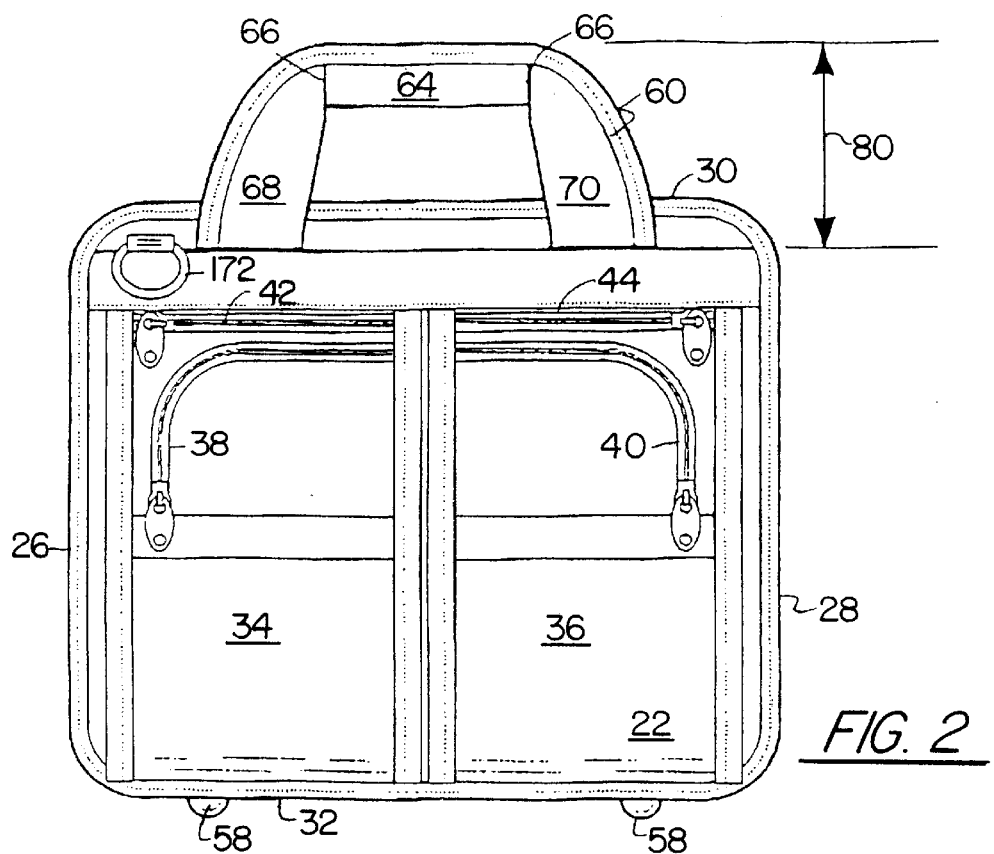
FIG. 2 is a front view of the tote of FIG. 1, shown with carrying handles in an extended position.
Figure 3:
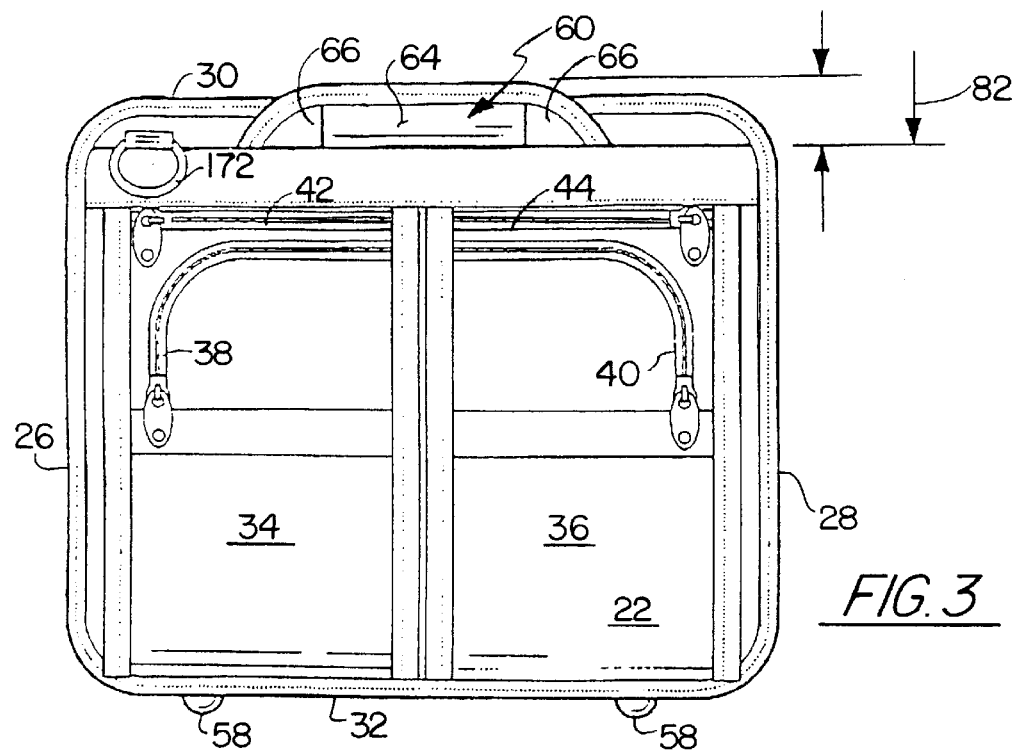
FIG. 3 is a front view of the tote of FIG. 1, shown with carrying handles in a retracted position.

With particular reference to FIGS. 1, 2 and 3, the tote front 22 includes two gusseted pockets 34 and 36 having zipper closure members 38 and 40, respectively, extending along a curved path so as to allow increased access to the insides of the pockets. Two small inset pockets (not shown) are disposed within a top portion of the gusseted pockets 34 and 36 and are accessed through horizontal zippers 42 and 44. Although not shown, preferably one gusseted pocket 34 includes an identification label on the outside surface and a key chain clip, such as a thumb-operated spring clasp, secured on the inside by a flexible strap material. Gusseted sides 46 permit the pockets 34 and 36 to expand as needed to store larger or a greater number of items. While the front 22 is shown with two pockets having two sets of zippers, the present invention is not limited in this regard, as a number of configurations of buckles may be used. Moreover, while preferably the pockets are closed with standard nylon zippers, any other suitable closure mechanism may be used, such as buttons, snaps and hook and loop fasteners.

Figure 4:
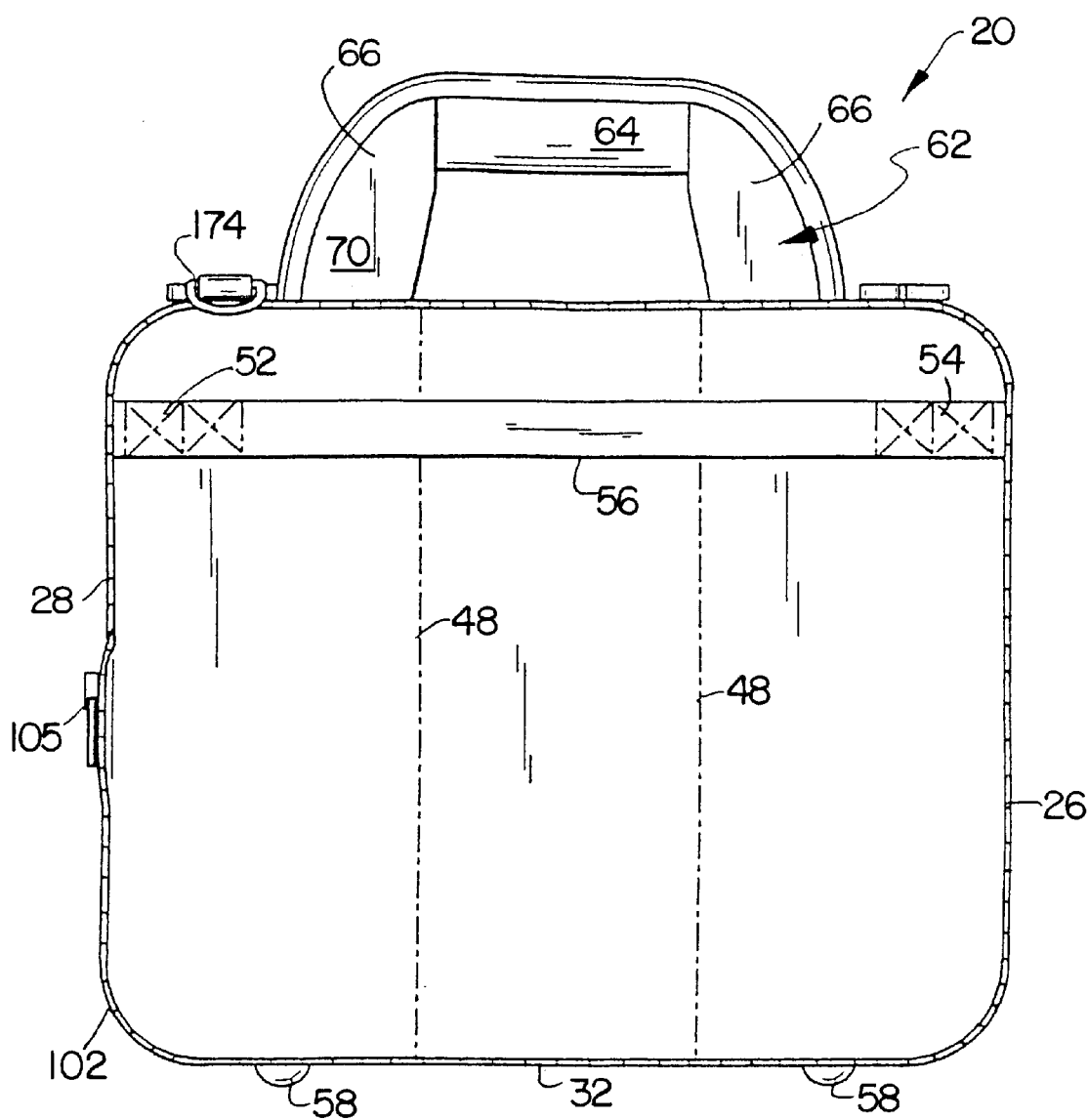
FIG. 4 is a back view of the tote of FIG. 2.
Figure 5:
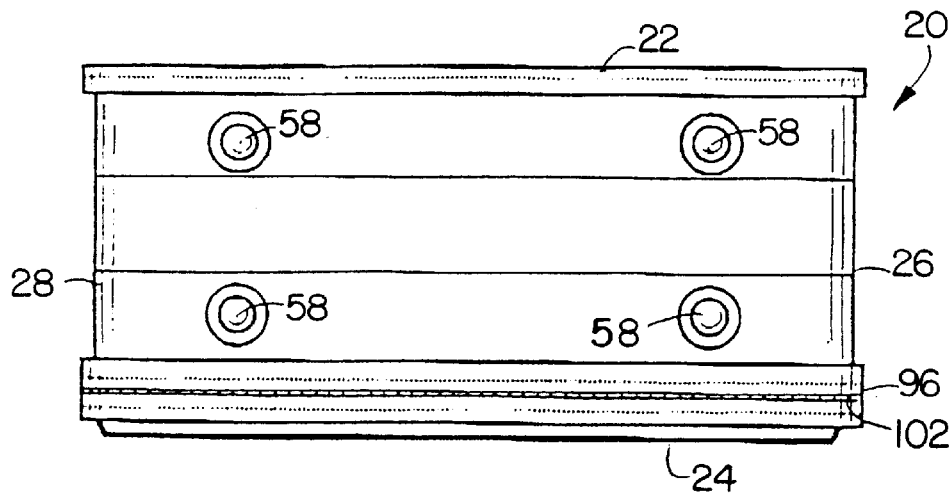
FIG. 5 is a bottom view of the tote of FIG. 1, showing support footings.

Referring again to FIG. 4, the tote back 24 includes padding material (not shown) secured in place by vertical stitching 48. The padding material cushions a wearer's back when the tote is used as a backpack, as described below. Also attached to the back 24 is a strap 50, preferably made of a suitable polypropylene webbing, stitched only at end segments 52, 54 so that an unfastened central portion 56 can be grasped and/or fit over the handle/support bars of common wheeled luggage and luggage carriers (not shown). Referring to FIGS. 4 and 5, the tote bottom 32 has four feet 58 suitably fastened thereon acting as a bumper and for supporting the tote 20 off the ground. The feet 58 are generally hemispherical and preferably made of a suitable polypropylene material. However, the present invention is not limited in this regard, as other suitable shapes and materials may be used.

Figure 6:
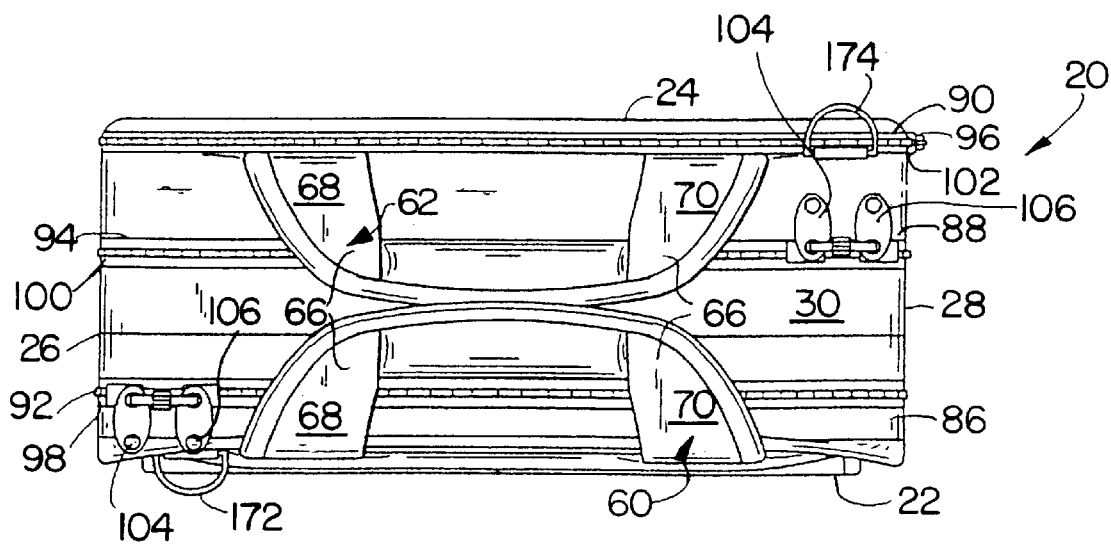
FIG. 6 is a top view of the tote of FIG. 1.

Referring to FIGS. 1 and 6, extending upward past the tote top 30 are two handles 60 and 62. The handles 60 and 62 each have a graspable cross-member 64 extending between top ends 66 of two uprights 68 and 70. The cross-members 64 are preferably a suitable leather or vinyl material wrapped around a padding material, such as a suitable foam, and the uprights 68 and 70 are preferably the same nylon fabric as the exterior sides of the tote. The flexibility of the fabric and the attachment location of the handles 60 and 62 to the tote 20 allow the cross-members 64 of both handles 60 and 62 to be brought together and grasped by one hand.

Figure 7:
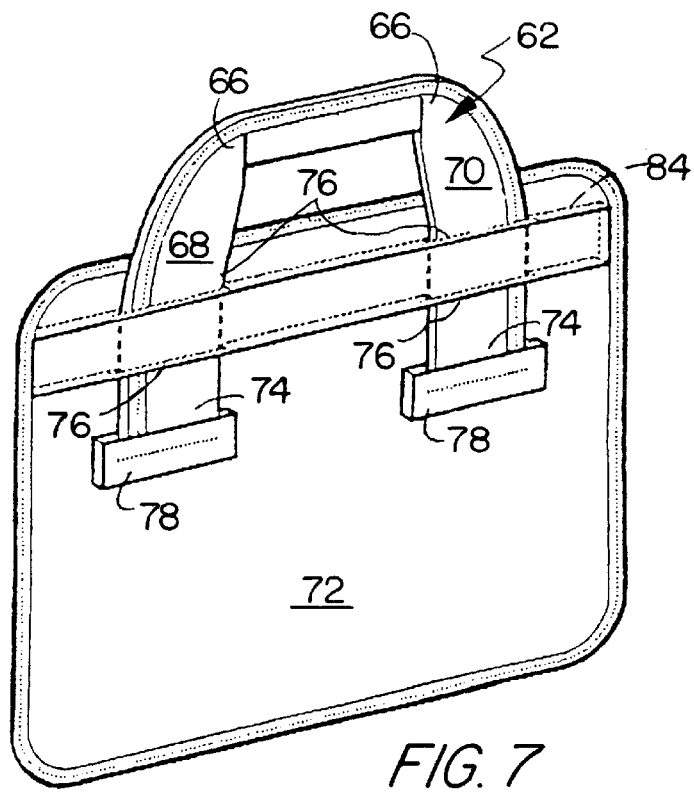
FIG. 7 is a perspective view of the retractable handle assembly attached to an inner partition.

Referring to FIG. 7, each handle 60 and 62 is restrained to an interior partition 22 (only one being shown). Specifically, bottom ends 74 of the uprights 68 and 70 are inserted through stitched eyelets 76 and capped by stop members 78 sized larger than the eyelets 76. The eyelets 76 are slightly larger than the width of the uprights 68 and 70. Although the uprights 68 and 70 are flexible, they are sufficient stiff to slide up and down within the eyelets 76 from an extended 80 to a retracted 82 position, as shown in FIGS. 2 and 3. The eyelets 76 for each handle 60 and 62 preferably are located in lateral and longitudinal alignment with each other and that of the other handle 60 and 62 so that both handles 60 and 62 extend and retract uniformly. Referring again to FIG. 7, the stop members 78 are preferably made of a heavy vinyl material that has sufficient rigidity to prevent the uprights 68 and 70 from being pulled through the eyelets 76 when in use. Additionally, a rigid bar 84 (shown in phantom), preferably made of a suitable metal, extends across a top portion of the partitions 72 to increase structural integrity of the partition 72 and help maintain the shape of the tote 20 when it is laden with heavy items and carried by the handles 60 and 62.

Referring again to FIGS. 1 and 6, the sides 22–32 define the exterior of the tote 20 as well as the boundaries of three externally accessed compartments, namely, an accessory compartment 86, a computer compartment 88 and a convertible compartment 90. These compartments are separated by two interior partitions 72 (one shown in FIG. 7) and include access openings 92, 94 and 96, respectively, having respective zipper closure members 98, 100 and 102 extending along at least the top side 30 of the compartments for opening and closing the access openings 92, 94 and 96.

Preferably, the zippers 98, 100 and 102 also extend along at least a portion of the ends 26 and 28 so that compartments 86, 88 and 90 are easily accessible. Also, preferably, the zippers 98 and 100 each include two zipper pull closure devices 104 and 106 such that the access openings 92 and 94 may be closed by sliding each zipper pull inwardly to meet at an intermediate position, rather than from end to end of the zippers 98 and 100. The convertible compartment 90 zipper 102 preferably has one zipper pull 105 for opening and closing the opening 96.

The accessory compartment 86 has an interior lining (not shown) made of a suitable plastic fabric, such as 240D Nylon offered by Du Pont, preferably having a lesser thickness. Preferably, the accessory compartment 86 includes a number of interior pockets (not shown) particularly suited for containing office supplies, computer accessories, electrical devices and other such items. For example, such interior pockets may have open tops or have flaps (not shown) which can be used to open and close the pockets. Preferably, these flaps are secured closed by a hook and loop fastener, however, any other suitable fastener may be used, such as snaps, zippers, buttons, etc. The accessory compartment 86 itself can be used to store papers, files or other similar items. Moreover, although the accessory compartment 86 is designed to hold office, business and electronic related items, it can be used to store any other suitably sized items.

Figure 8:
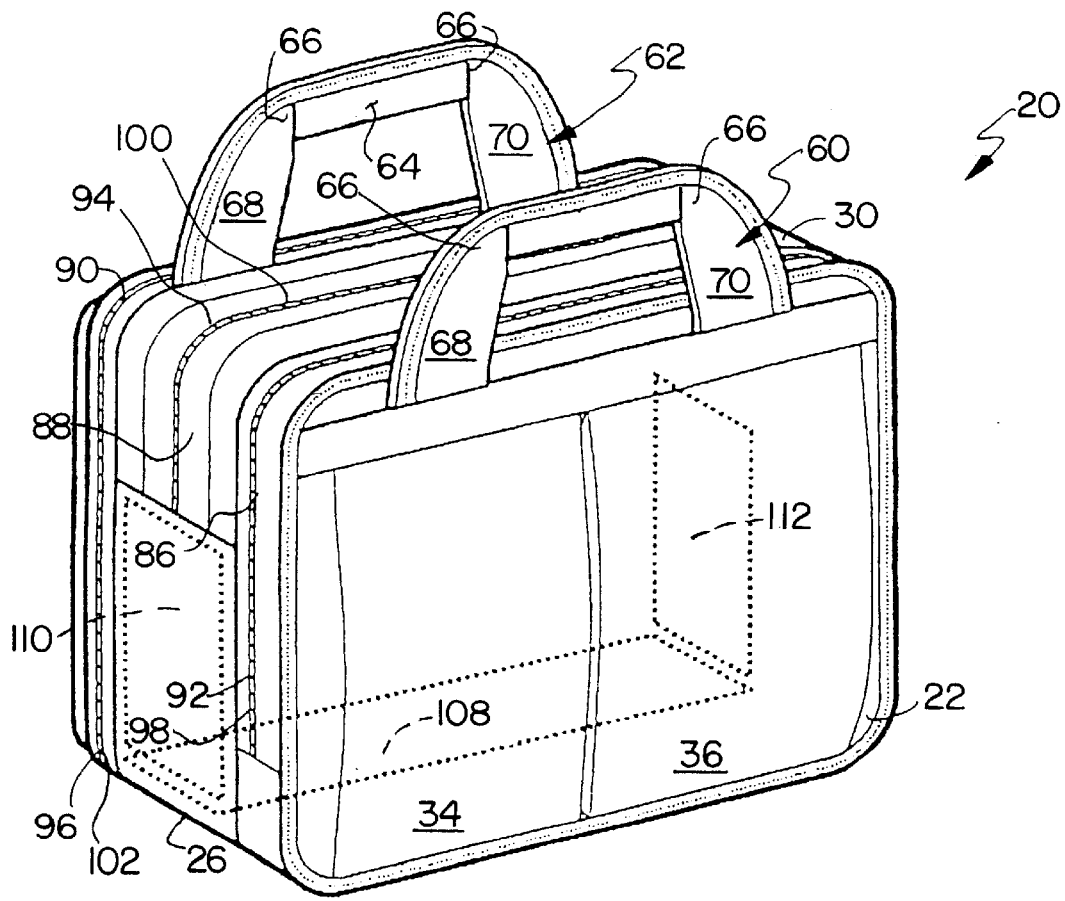
FIG. 8 is a perspective view of the tote of FIG. 1 showing internal pockets of the computer compartment in which padding material is contained.

Referring to FIG. 8, adjacent to the accessory compartment 86 is the computer compartment 88 sized to snugly contain a typical portable computer. The interior of the computer compartment is similarly lined with a thin thread nylon material that defines pockets in front (not shown), back (not shown), bottom 108 and ends 110 and 112 for containing a protective board (not shown) having a suitable cushioning material disposed thereon. These pockets may have access openings with suitable closure mechanisms for removing the board in the event items less affected by shock than a computer are to be stored in this compartment. The computer compartment 88 also preferably includes two straps (not shown) each fastened at one end to sides of the compartment and having a mateable fastener at their free ends, such as a hook and loop fastener. These straps act to restrain the computer securely in the computer compartment to further reduce the possibility of the computer being damaged.

Referring now to FIGS. 1, 5, 6 and 9, the convertible compartment 90 is adjacent to the computer compartment 88 and bounded by the back side 24. The convertible compartment 90 has the peripheral opening 96 closed by the zipper 102 beginning at a mated end 118 (see FIG. 9) and extending along the perimeter of the compartment slightly past the mated end 118 to a terminus 107 where the peripheral zipper 102 is sewn back upon itself to the tote material. The zipper 102 is opened and closed by appropriately sliding the zipper pull 105. When the tote 20 is to be carried by hand, i.e., in an attache configuration, the convertible compartment 90 is zipped closed to define a thin profile backing to the tote 20 (see FIG. 6). In this configuration, the convertible compartment 90 is preferably not used for storing or toting items, however, if desired the convertible compartment 90 can be used for carrying suitably sized items.

Figure 9A:
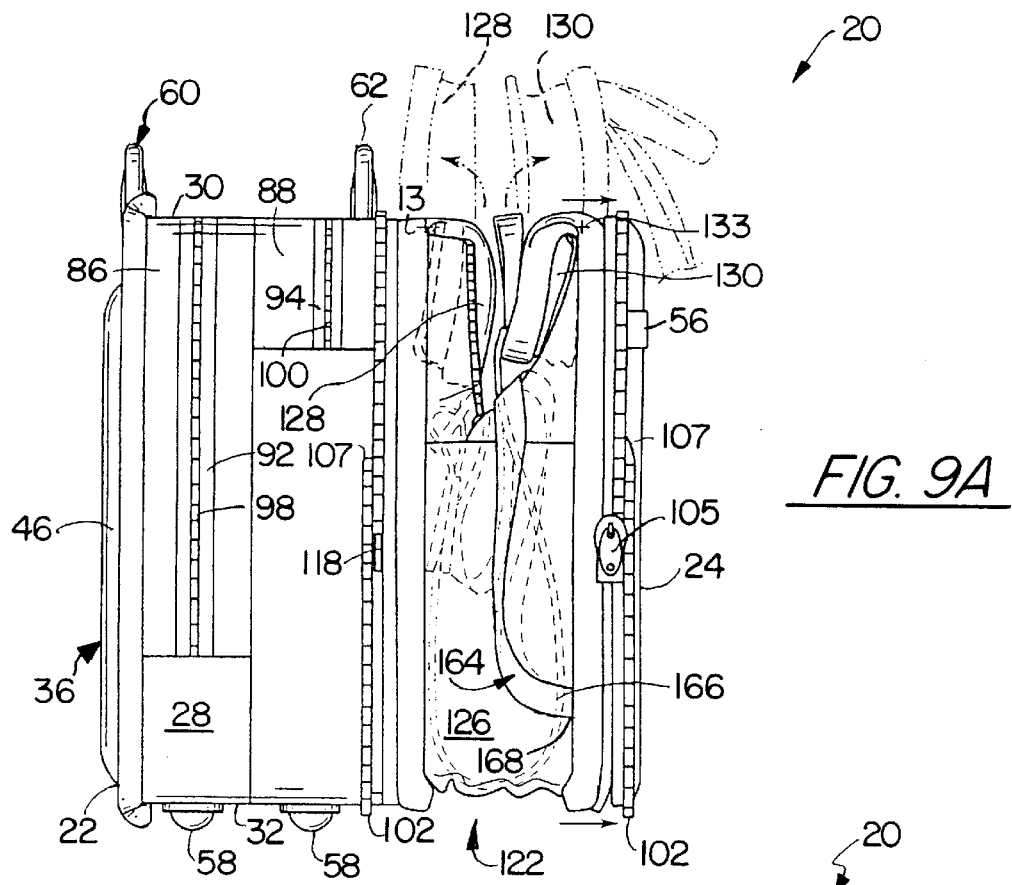
FIGS. 9A–9F depict the expansion/collapse of the tote from/to the attache case configuration to/from the backpack configuration, specifically.

FIGS. 9A–9F illustrate the process of expanding the tote 20 from the attache case configuration to the backpack configuration as well as the process in which the tote is collapsed back to the attache case configuration. Referring now to FIG. 9A, with the convertible compartment 90 unzipped and the mated end 118 of the zipper 102 separated, the back side 24 can be extended outward so as to define a collapsed backpack compartment 122 and reveal a shoulder harness 120. The backpack compartment 122 is in part defined by the back side 24 but also by expanded sides 124 and 126 and opposing front 128 and back 130 top portions, each preferably made of the same high strength nylon used for other parts of the tote exterior. The front 128 and back 130 top portions are folded inwardly in the attache case configuration and at the beginning of the expansion process, as shown in FIG. 9A.

Figure 10:
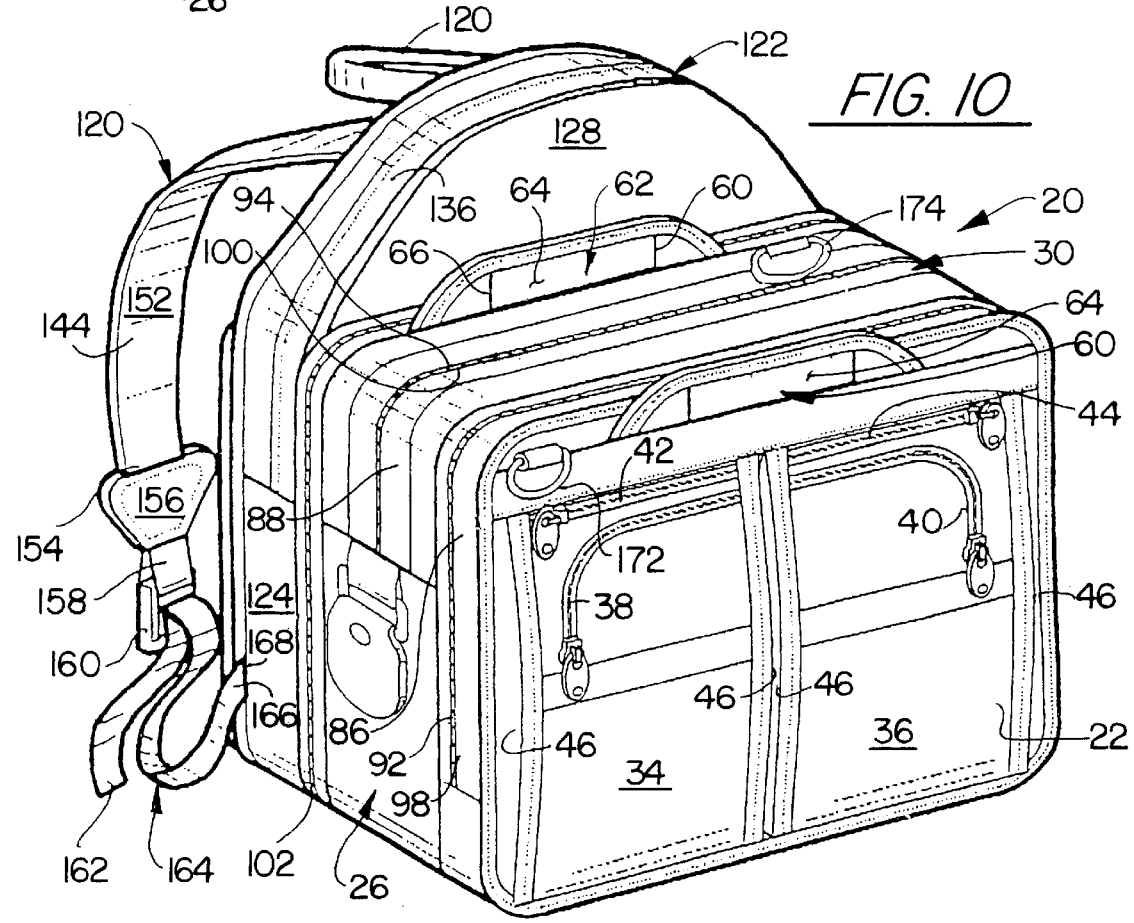
FIG. 10 is a perspective view of the tote of FIG. 1, shown with the expanded backpack compartment and shoulder harness.
Figure 9B:
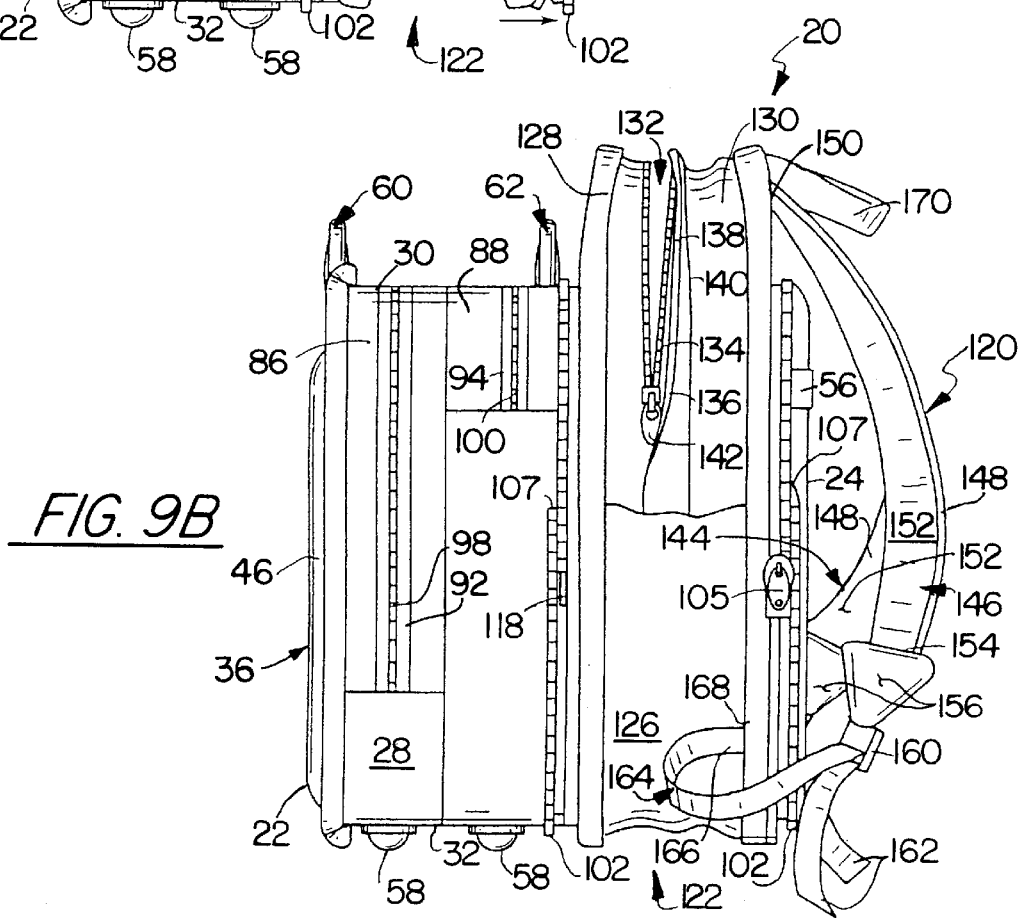
Figure 9C:
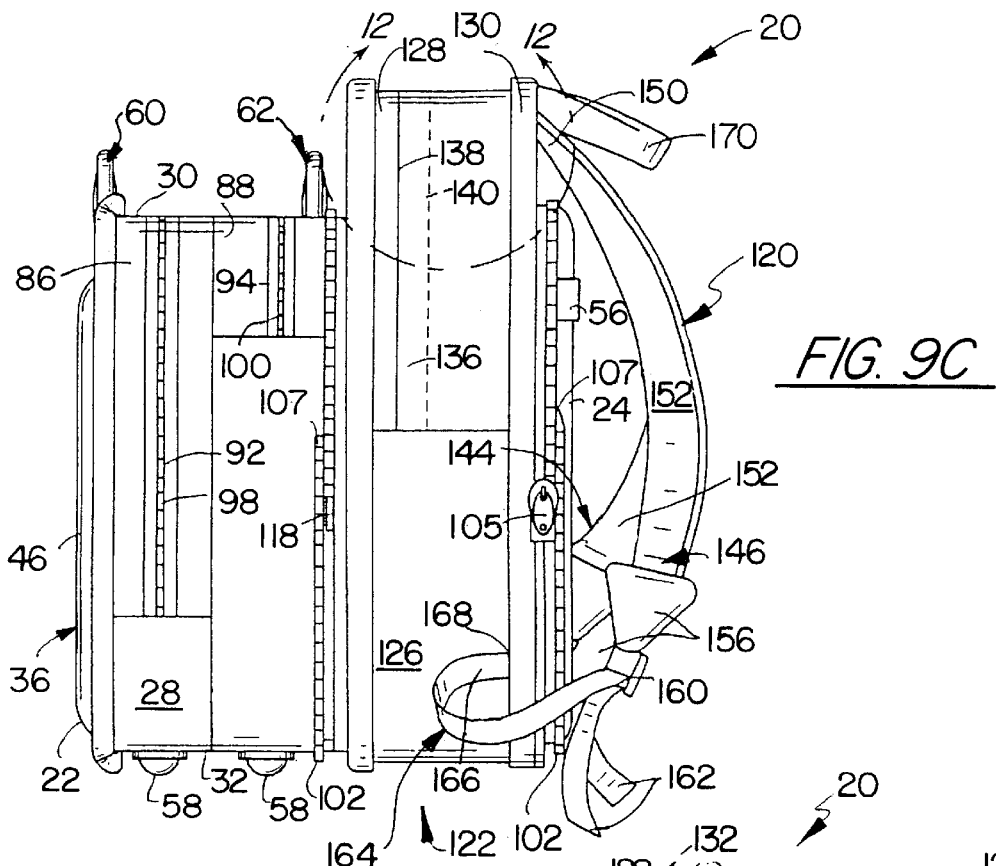

Referring to FIG. 9B, the top portions 128 and 130 are unfolded when the tote 20 is converted to a backpack, preferably along substantially parallel front 131 and back 133 fold lines or axes generally in or below the plane of the top 30. When unfolded, the front 128 and back 130 top portions extend upwardly past the plane of the top side 30. When the backpack compartment 122 is fully extended, it is as shown in FIGS. 9C and 10. In this configuration, the tote resembles a conventional backpack, due in large part to the upwardly extending top portions 128, 130. The back top portion 130 also provides additional surface area to that of the back 24, making the tote more comfortable to wear on one's back, much like a conventional backpack. Also, like the back 24, the back top portion 130 may also include a padding material for increased comfort for the wearer.

Figure 12:
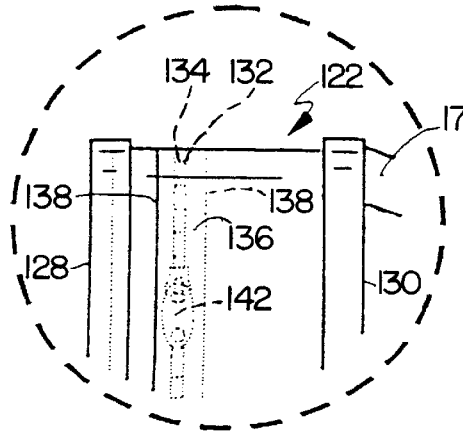
FIG. 12 is an enlarged view of section 12—12 of FIG. 9C, showing the backpack compartment closed and its zipper shown in phantom beneath a rain flap.
Figure 13:
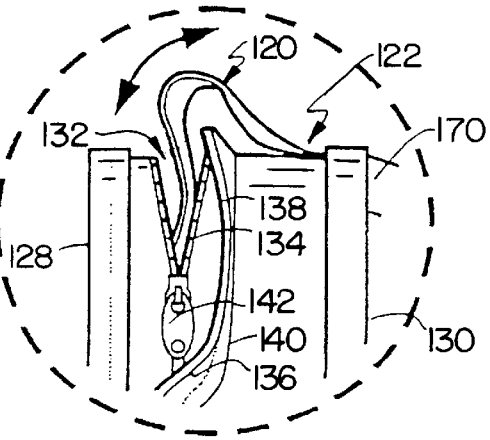
FIG. 13 is an enlarged view of section 12—12 of FIG. 9c, shown with the backpack compartment partially open with a shoulder strap partially contained therein.

The expanded sides 124 and 126 and top portions 128 and 130 define an access opening 132 having a zipper 134 extending therealong for opening and closing the backpack compartment 122. A flap 136 having a free edge 138 extends along this opening 132 to cover the zipper 134 (see FIG. 12) which can be pivoted along a seam edge 140 to access the zipper pulls 142 (see FIGS. 9 and 13). The flap 136 acts to prevent water, such as rain, from entering the inside of the backpack compartment 122. Preferably, the flap 136 is made of the same above described exterior nylon.

Figure 11:
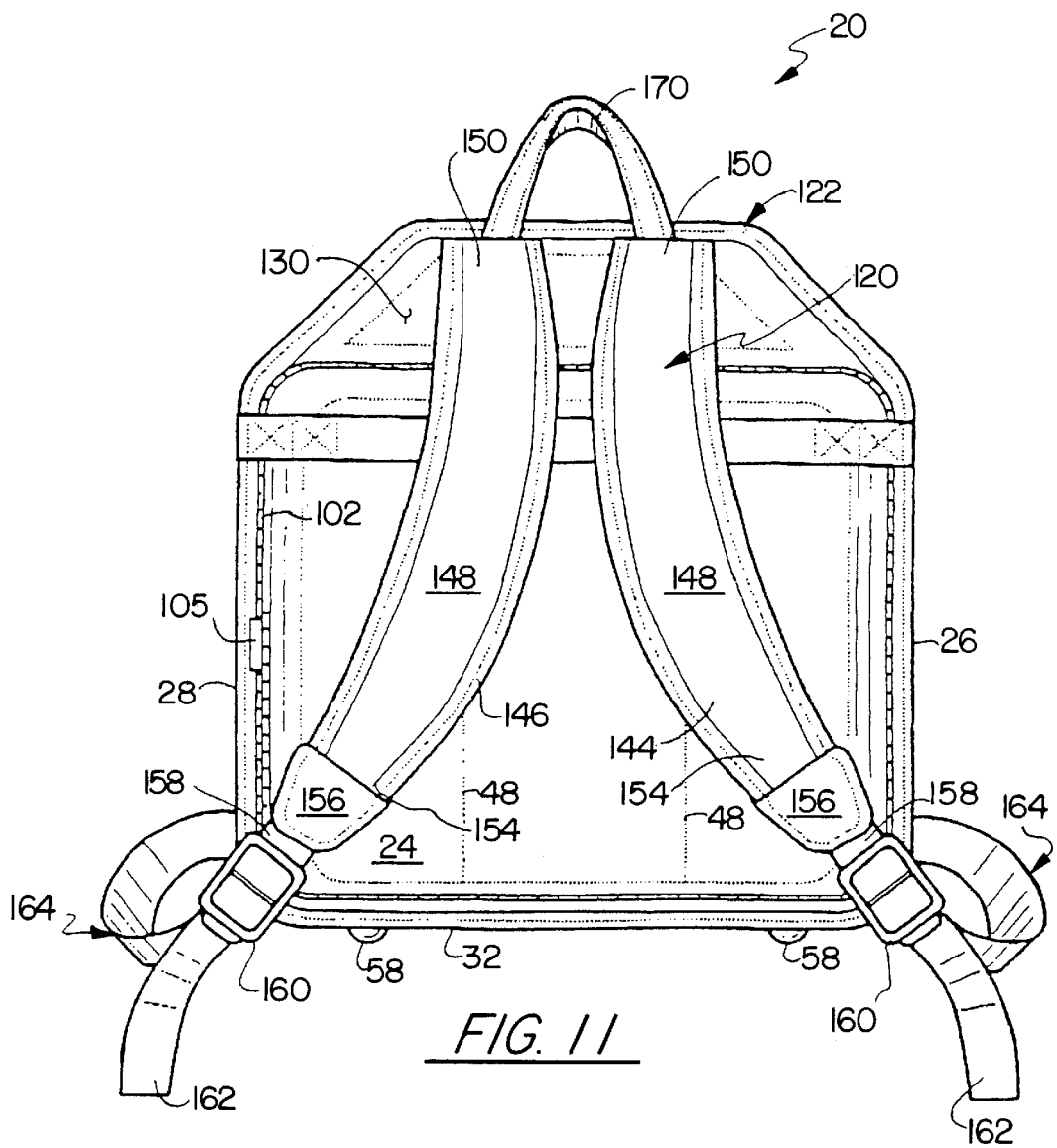
FIG. 11 is a back view of the tote expanded into a backpack as shown in FIG. 10.

Further, when the back top portion 130 is unfolded, the shoulder harness 120 is fully deployed to an wearable position, as shown in FIG. 9C, from within the backpack compartment 122. Referring to FIGS. 9C, 10 and 11, the shoulder harness 120 is comprised of two shoulder straps 144 and 146 each having a padded portion 148 with a top end 150 attached to the back backpack top portion 130 near its center. Preferably, the padded portions 148 are wider and thicker than conventional strapping providing additional comfort to the wearer. The inner surface 152 of the padded portions 148 have suitable non-skid material, such as polyvinyl chloride, to prevent the tote from sliding down or off the wearer's shoulders. A bottom end 154 of each padded portion 148 is attached to a reinforced connector 156 to which is attached a strap 158 looped about a plastic or metal slide buckle 160, as known in the art. Each slide buckle 160 receives a free end 162 of a strap 164 secured at a fixed end 166 to a lower side portion 168 on the backpack compartment 122 and within the peripheral zipper 102. Each free end 162 is threaded through the corresponding slide buckle, 160 as known in the art, for adjusting the size of the shoulder receiving loops formed between the back side 24 and shoulder straps 144 and 146. Although the straps are shown permanently fixed to the tote and adjustable, the present invention is not limited in this regard as the straps could be of fixed size without a buckle and removably attached to the tote at suitable strap clasps. Since the shoulder harness 120 is permanently fixed to the tote 20, once the correct shoulder strap length is set, the shoulder harness 120 is ready to be worn without requiring the wearer to attach the shoulder straps 144 and 146 or make any further adjustment.

Also attached to the back top backpack portion 130 at a top edge is a loop 170, preferably made of vinyl material.

The top loop 120 can be used for hanging the tote 20 by a hook or as another means for carrying the tote 20 when in the backpack configuration. The top loop 20 is also concealed when in tote 20 is in the attache configuration.

Figure 9D:
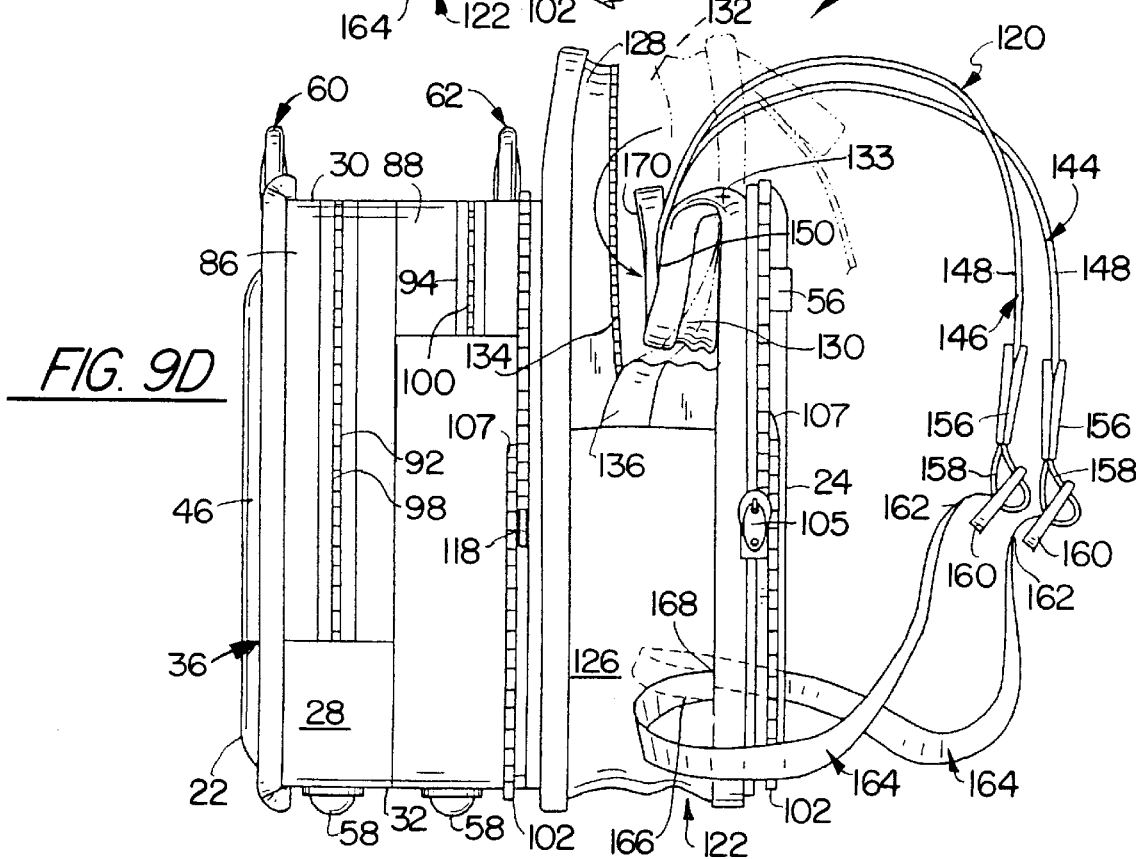
Figure 9E:
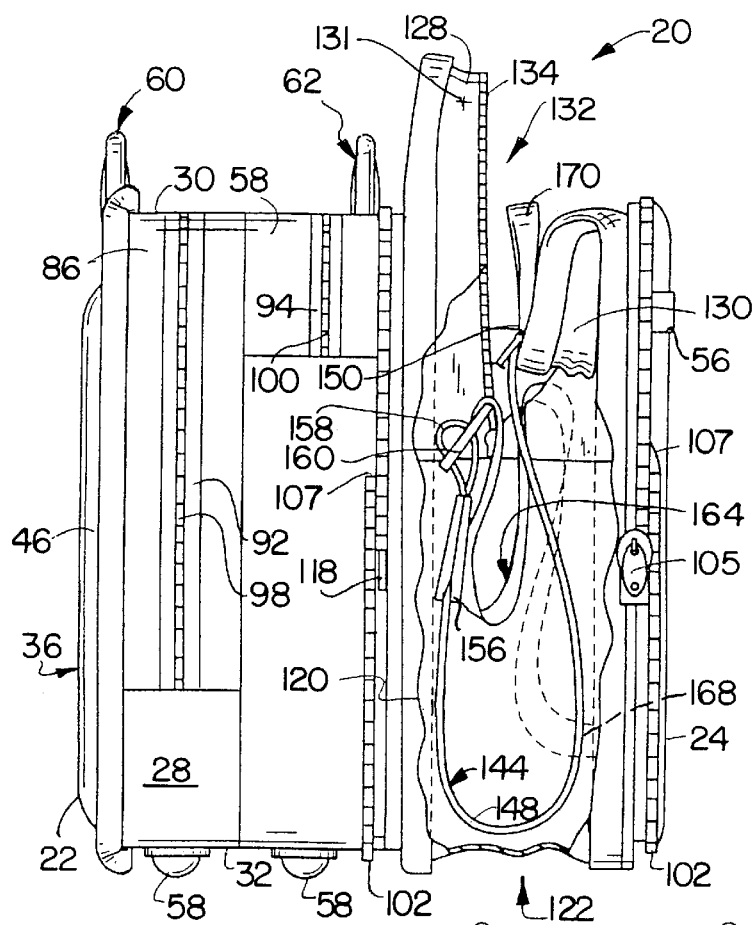
Figure 9F:
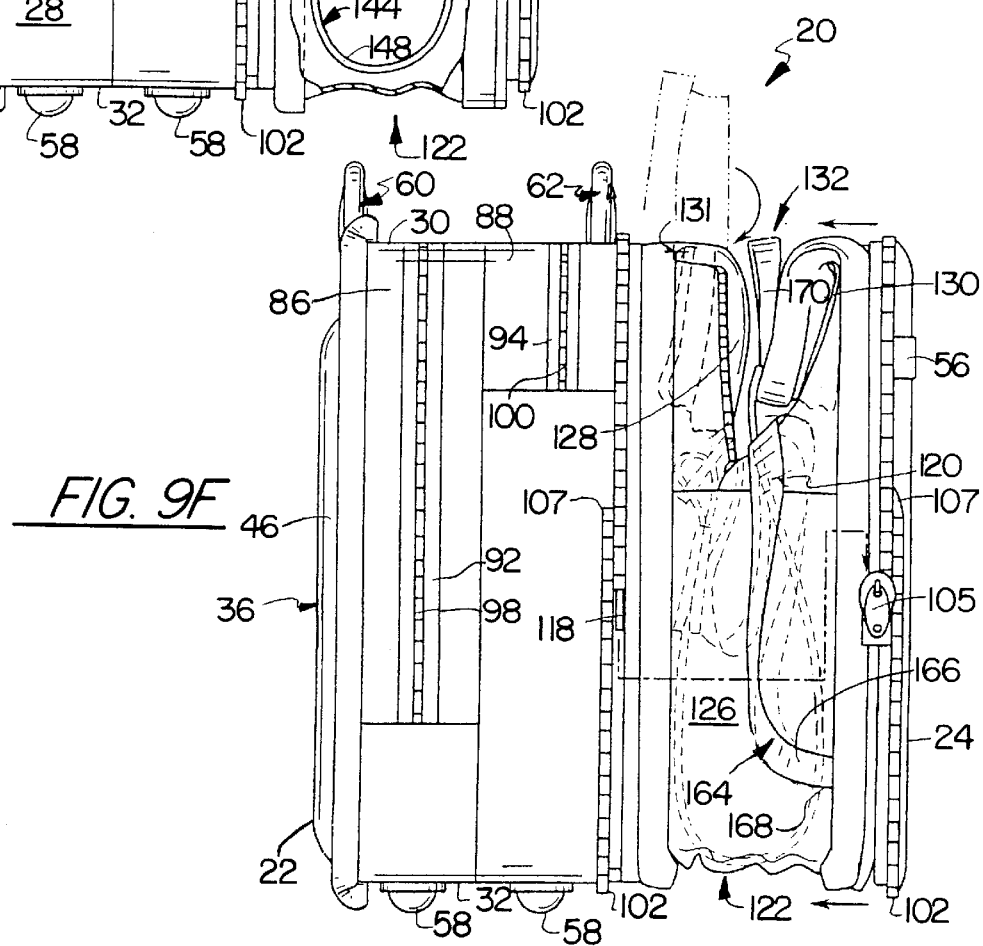

Referring to FIG. 9D, the process of collapsing the backpack compartment 122 to return the tote to the attache case configuration, begins by folding the back top portion 130 inwardly along the back fold line 133. Referring to FIG. 9E, doing this directs the top of the shoulder harness 120 into the backpack compartment opening 132. The backpack compartment 132 and the strap 164 of each shoulder strap 144 and 146 are appropriately sized to permit the padded portions 148 to be completely disposed within the backpack compartment 132. This ensures that the larger padded portions 148 do not interfere in closing the peripheral zipper 102. Moreover, because the fixed strap ends 166 of the shoulder straps are attached to the interior of the backpack compartment 122 and the top end 150 of the padded portion 148 is attached to a folded in top portion of the backpack compartment 122, the shoulder harness 120 is not visible when the tote 20 is in the attache case configuration. Referring now to FIG. 9F, the front top portion 128 is folded inwardly along fold line 131 so that it is within the backpack compartment 122. The back 24 can then be compressed inwardly and the peripheral zipper 102 closed, thus returning the compartment to the thin profile convertible compartment 90 and the tote to the attach case configuration.

In either the attache case or backpack configurations, a single-shoulder shoulder strap (not shown) can be attached to retaining rings 172 and 174 extending from the front and top, as shown in FIGS. 2 and 6. The shoulder strap may be left attached when the tote 20 is carried by hand or on one's back. Alternatively, the shoulder strap may be removed at spring-biased end clasps (not shown). The shoulder strap may then be stored in a tote compartment or in a home, office or other facility. Moreover, when in the backpack configuration, preferably the handles 60 and 62 are pushed down in the retracted position 82 (shown in FIG. 3) and the single shoulder strap is removed.

The present invention may include other aspects not specifically delineated in the aforementioned preferred embodiments. The above in no way is intended to limit the scope of the invention. Accordingly, in order to apprise the public of the full scope of the present invention, reference must be made to the following claims.

I claim:

1. A convertible tote for carrying a portable computer having an expandable storage volume defined by a front, a back, opposite sides, a top and a bottom, comprising:
    a computer compartment forming part of said storage volume sized to contain said portable computer, said computer compartment being accessed through an opening at least at said top having a first closure mechanism for opening and closing said computer compartment;
    a convertible compartment connected to said computer compartment and separated therefrom by a partition substantially parallel to said front and said back, said convertible compartment having a peripheral closure mechanism extending along the perimeter of said back for opening and closing said convertible compartment so as to transform said tote between an attache case configuration and a backpack configuration;
    a handle at said top suitable for grasping by hand so as to carry said case at least when in said attache case configuration; and
    a backpack harness disposed within and deployable from said convertible compartment for shoulder carrying said tote when in said backpack configuration;
    wherein said convertible compartment is expanded in said backpack configuration such that said tote storage volume is greater in said backpack configuration than in said attache case configuration.

2. The tote of claim 1, wherein said convertible compartment is adjacent to said back.

3. The tote of claim 1, wherein said tote includes at least one accessory storage compartment.

4. The tote of claim 1, wherein said computer compartment includes cushion material at a front, a back, a bottom and sides.

5. The tote of claim 1, wherein said convertible compartment defines a backpack compartment when said case is in said backpack configuration, said backpack compartment including an opening at least at said top for accessing said backpack compartment, said backpack compartment also having a second closure mechanism extending along said opening for opening and closing said backpack compartment.

6. The tote of claim 5, wherein said backpack compartment extends upward past the plane of said top giving said tote the appearance of a conventional backpack.

7. The tote of claim 6, further comprising a rain flap disposed along a top side of said second closure mechanism.

8. The tote of claim 6, further comprising an external loop at said top of said backpack compartment.

9. The tote of claim 1, wherein said backpack harness is not visible when said convertible compartment is closed.

10. The tote of claim 9, wherein said shoulder straps of said backpack harness have a first end and a second end, said first end being fastened proximate a top of said backpack compartment and said second end being fastened to lower side surfaces of said backpack compartment within a perimeter of said convertible compartment peripheral closure mechanism.

11. The tote of claim 10, wherein each of said shoulder straps are adjustable to define various sized shoulder openings allowing the shoulder straps to be loosened when taking off or putting on said tote as well as to be tightened so as to snugly fit differently sized users.

12. The tote of claim 11, wherein each of said shoulder straps are comprised of first and second straps, each of said first straps being secured at one end to a top of said backpack compartment and each of said second straps being secured at one end to opposite lower side surfaces of said backpack compartment, wherein corresponding first and second straps are joined by a buckle at respective free ends.

13. The tote of claim 11, wherein said first straps include a padding material.

14. The tote of claim 1, wherein said handle is at least partially retractable into said tote.

15. The tote of claim 14, wherein said handle is an inverted U-shape having a pair of uprights each joined at a top end to opposing ends of said cross member and having a stop member at their free end, further comprising a pair of retaining apertures proximate an interior partition in said tote, said retaining apertures being sized to permit uprights to slide from proximate said cross member to proximate said stop members.

16. The tote of claim 15, wherein said stop members are made of a flexible plastic material.

17. The tote of claim 16, wherein said handle is comprised of a second retractable handle located so that both handles can be grasped by one hand.

18. A tote convertible from an attache case configuration defining a first storage volume to a backpack configuration defining a second storage volume wherein said second storage volume is larger than said first storage volume, said tote having a front side, a back side, opposite end sides, a top side and a bottom side, comprising:

a convertible compartment defined in part by said back side, said convertible compartment including collapsible sides joining said back side to said top, bottom and end sides, and having a closure member at the periphery of said back side that when fastened joins said back side to said top side, bottom and end sides to define said attache case configuration and when unfastened permits said back side to be extended laterally outward at said collapsible sides so as to define said backpack configuration, such that said back side is substantially parallel to said front side in said backpack configuration.

19. The tote of claim 18, wherein the handle is at least partially retractable into the tote.

20. The tote of claim 18, wherein said closure member comprises first and second fastener halves, said first fastener half being attached at a rear perimeter formed by said top, bottom and end sides and said second fastener half being attached to said back side perimeter.

21. The tote of claim 20, wherein said closure member is a zipper.

22. The tote of claim 20, wherein said closure member is a hook and loop fastener.

23. The tote of claim 20, further including a computer compartment forming a part of said first and second storage volumes, said computer compartment sized to receive a portable computer, said computer compartment having padded bottom and side walls.

24. The tote of claim 20, further including at least one accessory compartments forming a part of said first and second storage volumes.

25. The tote of claim 20, wherein said handle is retractable so as to be at least partially disposed in said first and second storage volumes.

26. The tote of claim 20, wherein said back and collapsible sides in part define a backpack compartment having an opening for inserting items into said backpack compartment.

27. The tote of claim 26, wherein said backpack compartment further includes a closure member extending along said opening for opening and closing said backpack compartment.

28. The tote of claim 27, wherein a rain flap extends along said opening so as to cover said backpack compartment closure member, said rain flap having a fixed edge attached at said collapsible sides and a free edge allowing access to said backpack closure member.

29. The tote of claim 26, wherein said shoulder harness includes first and second shoulder straps attached to said backpack compartment such that when said tote is in said attache case configuration said shoulder harness is not visible.

30. The tote of claim 29, wherein said first and second shoulder straps each having a padded portion of increased width and thickness.

31. The tote of claim 26, wherein said backpack compartment further includes front and rear upper portions extending upward past the plane of said top side, said rear upper portion substantially extending in the plane of said back side so as to form, in conjunction with said back side, an increased surface area back side, said front and rear upper portions giving said tote the appearance of a conventional backpack when in said backpack configuration.

32. The tote of claim 31, wherein at least one of said back side and said rear upper portion includes padding material.

33. The tote of claim 31, wherein said shoulder harness includes first and second shoulder straps each having top and bottom ends attached to said backpack compartment such that when said tote is in said attache case configuration said shoulder harness is not visible.

34. The tote of claim 33, wherein said when said top ends are fastened to said rear upper portion and said first shoulder strap bottom end is fastened to a first end side of said collapsible sides and said second shoulder strap bottom is fastened to an opposite end side of said collapsible sides.

35. The tote of claim 33, wherein said first and second shoulder straps have a ribbon portion and a padded portion of increased width and thickness.

36. The tote of claim 35, further comprising strap buckles for adjusting the size of shoulder loops formed by said first and second straps, wherein said ribbon portions have first and second halves, said first halves each having a free end and an opposing fixed end joined to corresponding said padded portion, said second halves each having a free end and an opposing fixed end comprising said strap bottom ends, said buckles adjustably joining said first and second strap free ends.

37. The tote of claim 33, wherein said front and rear upper portions can be folded inwardly into said backpack compartment opening for collapsing said backpack compartment.

38. The tote of claim 37, wherein said front and rear upper portions are folded at respective parallel front and rear fold axes substantially in the same plane as said top side.

39. The tote of claim 37, wherein said backpack compartment opening extends down said collapsible end sides so that said first and second strap padded portions can be disposed within said backpack compartment when said upper portions are folded into said backpack compartment opening.

* * * * *